Figure 1:
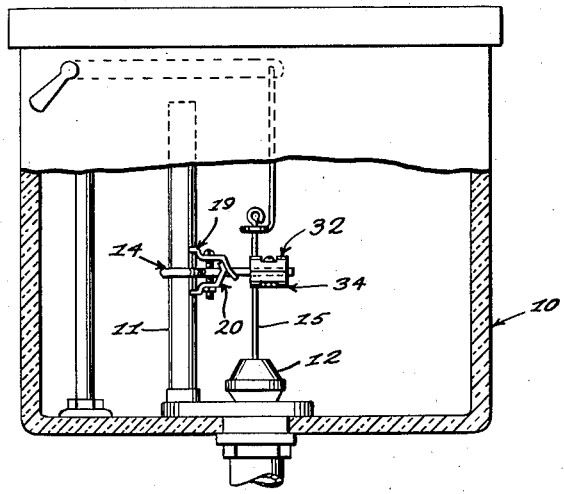

March 28, 1950 — C. L. SHOBE — 2,502,065

FLUSH VALVE BRACKET

Filed Jan. 20, 1948

INVENTOR.
CHESTER L. SHOBE
BY
McMorrow, Berman & Davidson
ATTORNEYS

Patented Mar. 28, 1950

2,502,065

UNITED STATES PATENT OFFICE 2,502,065

FLUSH VALVE BRACKET

Chester L. Shobe, Great Bend, Kans.

Application January 20, 1948, Serial No. 3,342

5 Claims. (Cl. 4—57)

1

This invention relates to an improved flush valve bracket for slidably mounting the valve stem of the flush valve of a water tank.

It is an object of this invention to provide an improved bracket for a flush valve of the kind to be more particularly described hereinafter which may be suitably applied to the overflow pipe of a tank irrespective of the physical condition of the exterior of the pipe.

Another object of this invention is to provide a valve stem bracket of this kind having a valve guide mounted on the arms of the wire supporting member whereby the valve guide may be adjusted along the length thereof as desired.

Still another object of this invention is to provide a device of this kind which will clamp on and fit all sizes of overflow tubes without any special adjustment before installing.

A further object of this invention is to provide a device of this kind in which the attached bolts or screws are disposed with the screw head upwardly whereby they may be reached from the upper end of the tank.

With the above and other objects in view, my invention consists in the arrangement, combination and details of construction disclosed in the drawings and specification, and then more particularly pointed out in the appended claims.

Figure 2:
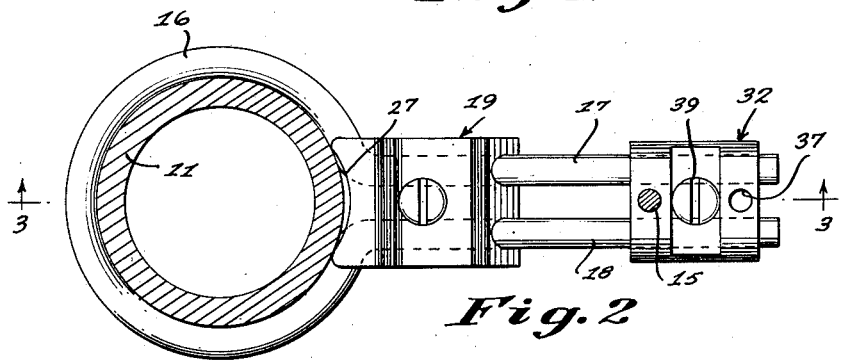
Figures 3, 4:
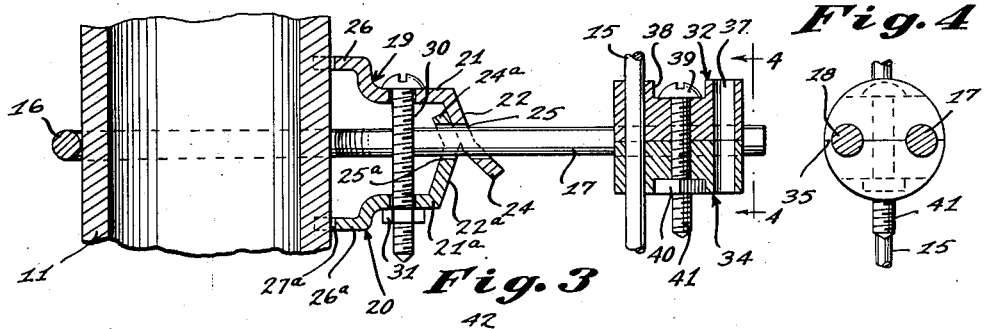
Figure 5:
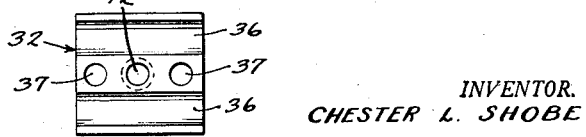

In the drawings,

Figure 1 is a front elevation partly broken away and partly in section of a flush tank having a valve stem bracket constructed according to an embodiment of this invention, Figure 2 is a top plan view partly broken away and partly in section of the bracket, Figure 3 is a longitudinal section taken on the line 3—3 of Figure 2, Figure 4 is a vertical section taken on the line 4—4 of Figure 3, and Figure 5 is a bottom plan view of one of the bearing guide members removed from the assembly.

Referring to the drawings, the numeral 10 designates generally a flush valve tank having an overflow pipe 11 therein and a valve ball or bulb 12. The ball 12 is of conventional design for floating in the tank 10 when raised from the valve seat and is held in sealing engagement with the seat by the force of water in the tank.

The numeral 14 designates generally an improved valve stem bracket for slidably supporting the stem 15 of the valve 12 in the tank. The improved bracket 14 of this invention is formed of an elongated length of wire bent upon itself to form a loop or eye 16 at one end thereof which

2 constitutes substantially a split ring for engagement about the overflow tube or pipe 11.

A pair of parallel arms 17 and 18 extend from the free ends of the split ring 16 and are disposed substantially radially thereto. The arms 17 and 18 extend outwardly from the pipe 11 for disposition above the valve for supporting the valve stem 15 therebetween.

A pair of clamping members 19 and 20 are provided for engagement about the arms 17 and 18 and with the pipe 11 for securing the bracket 14 thereto. The upper clamping member 19 is formed of a length of flat metal or other suitable material having a substantially horizontal central portion 21 and a downwardly inclined outer end 22.

The outer end 22 is formed at its lower edge with a forwardly inclined terminal end as 24. The clamping member 19 is formed with a pair of openings 25 at the juncture of the portions 22 and 24. The arms 17 and 18 are adapted to be disposed within the openings 25 substantially parallel to the horizontal portion 21.

The rear end 26 of the clamping member 19 is upwardly offset from and parallel to the central portion 21. The rear end 26 of the clamping member 19 is formed with an arcuate end edge 27 for engagement with the pipe 11. The lower clamping member 20 is substantially the same formation as the upper clamping member 19 and is disposed in inverted relation thereto.

The substantially vertical arm 22a of the member 20 is disposed at a sharper upward angle than the end 22 and has an inwardly inclined terminal portion 24a adapted to abut the end 22.

A pair of openings 25a are provided at the juncture of the portions 22a and 24a and the lower extreme end 26a of the member 20 is provided with an arcuate edge 27a in the same manner as the member 19. The arms 17 and 18 engage through the openings 25a and the terminal end edge 27a is disposed in downwardly spaced relation relative to the engagement of the split ring with the pipe 11.

A bolt 30 engages between the horizontal portions 21 and 21a of the clamping members and a nut 31 on the bolt firmly holds the members 19 and 20 together in clamping relation on the arms 17 and 18 and on the pipe 11.

A pair of guide members as 32 and 34 are provided for sliding engagement on the arms 17 and 18. The members 32 and 34 are substantially semi-circular in cross section as shown in Figure 4 of the drawings. The diameter or flat surface as 35 of each of the members 32 and 34 is provided with a pair of elongated recesses 36 extending along the length of the members.

Each of the members 32 and 34 is formed with a pair of radially disposed openings 37 on opposite sides of the longitudinal medium thereof. The openings 37 provide bearing surfaces within which the valve stem 15 is slidably engageable. The upper convex surface of each of the members is provided with a recess or cutout as 38 within which the head 39 of a clamping bolt 41 or the nut 40 associated therewith may be engaged.

The bolt 41 engages through an opening 42 in each of the members 32 and 34 substantially midway the longitudinal medium thereof and between the openings 37. The bolt 41 extends through both of the clamping members 32 and 34 between the arms 17 and 18 for clamping the members in selected adjusted position along the length of these arms.

In the use and operation of this flush valve bracket, the clamping members 19 and 20 are initially engaged on the arms 17 and 18 loosely and the split ring 16 is then positioned about the overflow pipe 11. The clamping members 19 and 20 are then slid toward pipe 11 so that the free end edges 27 and 27a thereof will engage the pipe 11 above and below the split ring. The bolt 30 which is disposed between the arms 17 and 18 when tightened with the nut 31 will force the edges 27 and 27a and an opposite portion of ring 16 into clamping engagement with the pipe 11 at the selected position along the height thereof.

The two openings 37 in the bearing members 32 and 34 are provided for guides or bearings for the stem 15. As much wear is had between the stem 15 and the bearing surfaces, when one of the surfaces of the bearings becomes worn the members 32 and 34 may be adjusted along arms 17 and 18 so that the other opening may be used.

The arms 17 and 18 are loosely disposed within the recesses 36 of the confronting members 32 and 34. The stem 15 is then positioned through a selected one of the openings 37. The bearing members 32 and 34 are then slid along the arms 17 and 18 until the stem 15 is perfectly vertical. The bolt 41 is then tightened for clamping the guide members to the arms.

As seen in the drawings, the heads of the bolts are faced upwardly so that they may readily be reached by a screw driver from above the surface of the tank.

When the nuts are corroded on the bolts sufficient force may be applied to the screws at this time to break the screws rather than attempt to saw them or to break the bearings and clamps as is the customary procedure when it is desired to replace the clamp or bearings for the valve stem.

Having thus described my invention, what I claim is:

1. A flush valve bracket comprising a split ring for engagement about an overflow pipe, a pair of spaced apart parallel arms on the ends of said ring extending radially therefrom, a lower clamping member formed with a pair of openings at one end thereof through which said arms are adapted to engage, the lower end of said member engaging said overflow pipe below said ring, an upper clamping member formed with a pair of openings at one end thereof through which said arms are engaged, the upper end of said latter member engaging said overflow pipe above said ring, a bolt engaging through said clamping members intermediate the length thereof for clamping said ring on said pipe, a pair of vertically opposed valve stem guide members on said arms, outwardly of said clamping members, each of said guide members being formed with a longitudinally grooved surface engaging partially about said arms, each guide member being formed with a pair of horizontally spaced apart vertical bearings disposed between said arms, and a bolt engaging through said guide members for adjustably securing said guide members at a selected position along the length of said arms.

2. An improved valve stem guide bracket for a flush valve comprising a split ring engageable about an overflow pipe adjacent said valve, a pair of horizontally spaced apart arms on the free ends of said ring substantially radial thereto, a pair of elongated flat clamping members slidable on said arms, said members including portions disposed above and below said arms, said portions having inner ends clampingly engaging said overflow pipe above and below said ring, a vertical clamping bolt engaging said members intermediate the length thereof and between said arms, a pair of vertically-opposed longitudinally-extending guide members disposed on opposite sides of said arms, said guide members being formed with vertically aligned bearings through which said valve stem is freely slidable, and a vertical bolt engaging said guide members for clamping said guide members at a selected position along the length of said arms.

3. An improved valve stem guide bracket for a flush valve comprising a split ring disposed about an overflow pipe, a pair of spaced apart arms extending radially from the free ends of said ring, a pair of vertically-spaced clamping members on opposite sides of said arms, means slidably and rockably mounting said members on said arms, said members clampingly engaging said overflow pipe on opposite sides of said arms, a bolt engaging said members intermediate the length thereof, a pair of vertically-opposed valve stem guide members on opposite sides of said arms and slidable thereon, said members being formed with aligned bearings therethrough and a vertical bolt engaging said guide members for clamping said guide members on said arms.

4. An improved valve stem guide bracket for a flush valve comprising a split ring disposed about an overflow pipe, a pair of spaced apart arms extending radially from the free ends of said ring, a pair of vertically-spaced clamping members on opposite sides of said arms, means slidably and rockably mounting said members on said arms, said members clampingly engaging said overflow pipe on opposite sides of said arms, a bolt engaging said members intermediate the length thereof, a pair of vertically-opposed valve stem guide members on opposite sides of said arms and slidable thereon, said members being formed with aligned bearings therethrough, a vertical bolt engaging said guide members for clamping said guide members on said arms, said guide members formed with grooves engaging said arms on opposite sides of said last named bolt.

5. An improved valve stem guide bracket for a flush valve comprising a split ring disposed about an overflow pipe, a pair of spaced apart arms extending radially from the free ends of said ring, a pair of vertically-spaced clamping members on opposite sides of said arms, means slidably and rockably mounting said members on said arms, said members clampingly engaging said overflow pipe on opposite sides of said arms, a bolt engaging said members intermediate the length thereof, a pair of vertically-opposed valve stem guide members on opposite sides of said arms and slidable thereon, said members being formed with aligned bearings therethrough and a vertical bolt engaging said guide members for clamping said guide members on said arms, said clamping members being disposed with end edges engaging said overflow tube in vertically spaced relation to said ring.

CHESTER L. SHOBE.

REFERENCES CITED

The following references are of record in the file of this patent:

UNITED STATES PATENTS

| Number | Name | Date |
|---|---|---|
| 1,041,746 | Cornelius | Oct. 22, 1912 |
| 1,949,092 | Van Dyke | Feb. 27, 1934 |
| 2,393,139 | Broadman | Jan. 15, 1946 |
| 2,429,485 | Pleasant | Oct. 21, 1947 |